United States Patent
Tuzov

[11] Patent Number: 5,898,902
[45] Date of Patent: Apr. 27, 1999

[54] METHOD AND APPARATUS FOR MULTIPLE-STATION COMMUNICATION FOR LOW-ORBIT SATELLLITE SYSTEMS

[76] Inventor: Georgy Ivanovich Tuzov, Federation, Moscow, ul.,Stroitelei, d.5, korp. 3, kv.24, Moscow, Russian Federation

[21] Appl. No.: 08/714,122
[22] PCT Filed: Mar. 16, 1995
[86] PCT No.: PCT/RU95/00044
    § 371 Date: Sep. 16, 1996
    § 102(e) Date: Sep. 16, 1996
[87] PCT Pub. No.: WO95/25388
    PCT Pub. Date: Sep. 21, 1995

[30] Foreign Application Priority Data

Mar. 17, 1994 [RU] Russian Federation .............. 94009037
Mar. 17, 1994 [RU] Russian Federation .............. 94009148
Mar. 17, 1994 [RU] Russian Federation .............. 94009502

[51] Int. Cl.$^6$ .................................................. H04B 7/185
[52] U.S. Cl. .......................................... 455/13.1; 455/13.2
[58] Field of Search .................................. 455/427, 428, 455/431, 12.1, 13.1, 13.2, 502; 370/316

[56] References Cited

U.S. PATENT DOCUMENTS

| | | |
|---|---|---|
| 4,375,697 | 3/1983 | Visher . |
| 4,532,635 | 7/1985 | Mangulis . |
| 5,471,641 | 11/1995 | Dosiere et al. .......................... 455/13.1 |

FOREIGN PATENT DOCUMENTS

| | | |
|---|---|---|
| 2134755 | 8/1984 | United Kingdom . |
| WO 86/02507 | 4/1986 | WIPO . |
| WO 86/02507 | 4/1996 | WIPO . |

OTHER PUBLICATIONS

Tuzov et al., "Interference Immunmity of Radio Systems with Composite Signals", Radio i Svyaz Publishers, pp. 130–157, 1985.

Application of Motorola Satellite Communications, Inc. to the Federal Communications Commission, Washington, District of Columbia, to construct IRIDIUM Low Earth Orbit Mobile Satelite Communication System, Dec. 1990.

*Primary Examiner*—Nguyen Vo
*Attorney, Agent, or Firm*—Pennie & Edmonds LLP

[57] ABSTRACT

In the method of multiple-station communication for low-orbit satellite systems, according to which service information modulated pseudirandom synchronization signals are emitted from a satellite transponder over the entire band of the transmission spectrum, information packets are received. from user stations, mismatches by frequency and delay are measured, and the mismatches and information portions of the packets are memorized, they are reswitched and reemitted with spatial, frequency- and time-division multiplexing; all the user stations receive the synchronization signals and the information packets assigned to them, with the transmitters being autotuned by frequency and delay with multi-base information encoding; there are provided high-orbit satellite transponders for integration with the low-orbit satellite transponders; search of signals and initial synchronization of channels owing to linear discrete scanning of the clock-frequency signals of the user station transmitters with compensation for the Doppler shift by the clock frequency, evaluations of the instants of correlation convolutions of the relayed signals with reference signals in two points by each user, calculation of the number of the scanning steps between the convolutions and evaluation of the delay introduced into the emitted signal.

12 Claims, 4 Drawing Sheets

METHOD AND APPARATUS FOR MULTIPLE-STATION COMMUNICATION FOR LOW-ORBIT SATELLLITE SYSTEMS

FIELD OF THE INVENTION

The present invention relates to the field of communication via satellite transponders, and more specifically, to a method of constructing a multi-station communications system with free access of subscribers through low-orbit satellites, a method of multiple-station communication with integration of low-orbit and high-orbit satellite systems, and a method of signal search end initial channel synchronization in the satellite communications system, and to apparatus for implementing these methods.

BACKGROUND ART

There are presently communications systems operating via satellite transponders located in a stationary or a high-elliptical orbit.

In the last few years, however, there is great interest in systems of personal communications with direct access by users and with low-orbit satellite transponders, which affords a drastic decrease in the energetics of radio lines and the use of small-size user stations. Such systems hold particular promise for personal communication with the users disposed on mobile objects or in hard-to-reach areas.

It is to be noted at the same time that the low-orbit satellite systems are extremely complicated because at a height of the satellite transponder in the order of 700 to 22000 km, there are considerable movements of the satellite transponder relative to users, resulting in high Doppler shifts of signal frequencies, and a short time period within which satellite transponders remain in the visibility range of the user consequently, complex equipment of satellite transponders and user stations must be used. Considerable problems arise in case it is required to establish continuous and stable communication of the users during any period of time.

Most known in the art are satellite communications systems with direct signal re-relaying by satellite transponders. A class of satellite communications systems is known in which a partial (or complete) processing of signals from the user stations is performed at the satellite transponders.

Systems are also known of the same class which ensure synchronization of not only the receivers of the user stations but their transmitters as well, which makes it possible to simplify the transponder process, which performs processing of signals from many user stations (G. I. Tuzov et al, "Interference immunity of radio systems with composite signals", edited by G. I. Tuzov, M., Radio i svyaz publishers, 1985, pp 130–132).

There are disclosures of a number of specific satellite low-orbit telephone communications systems. Thus, in the application of "Motorola satellite communication Inc." for the low-orbit communications system, "IRIDIUM" submitted to FCS, Washington, USA, 1990, by the inventors Golsky L. S., Malet F. I., Mutke A. M. is disclosed a communications system including 66 satellite transponders, which ensures global cellular personal telephone communications. This system is disadvantageous in that it has a low level of noise immunity and electromagnetic compatibility, which is defined by the shape of the simple signals used in the system and by the problems in implementing the specific in addition, the system suffers from cellular structure low level of privacy of talks without application of specialized means.

In the application of "Loral cellular systems, corp.," for the system "Globalstar" submitted to FCS, Washington, USA, 1991, by the inventors L. K. Smith, R. M. Halperin, L. A. Taylor, is disclosed another form of a low-orbit satellite communications system. This system is most close to the method of the present invention by the technical essence, shape of the signals used and the effect obtained. Both the method of the present invention and the prior-art method use wide-band pseudorandom phase-shift keyed signals.

Among the disadvantages of the prior-art method is the presence of regional stations providing for control of the communications system and switching of signal flows at satellite transponders, which, though simplifying the transponder design, results, however, in narrowing the area and time of service (communication is ensured only under the condition of transponder visibility at an angle of elevation greater than the limiting one from three points simultaneously, namely, two points of location of the user stations and the point of location of the regional station), and also in increasing signals delay along their propagation route. Among the disadvantages of the prior-art method is also the limitedness of the area of servicing the users and impossibility of effecting global communication.

Considerable difficulties arise in providing continuous communication in the system, which presupposes synchronous transfer of the relaying functions from one (flying past) satellite transponder to another (flying next) at the user stations arbitrarily disposed in the service area. In this case continuity of communication can be provided under the condition of simultaneous visibility (at least during a short time period) of the two satellite transponders following one the other from three points at once, namely, two points of location of the user stations and the point of location of the regional station. In this case the necessity arises of either increasing the number of the satellites in the orbit or of increasing the number of regional stations, which results in greater costs and makes the communications system more complicated. It is to be noted that the level of electromagnetic compatibility (EMC) in the "Globalstar" system is not high because multiple circulation of the signal flows takes place between the Earth and satellite transponder. The disadvantages of this form of the communications system are also not high level of noise immunity, in particular, along the channels of synchronization and service communication, the serviceability of the entire system being dependent on the adequate operation of these channels; there is no solutions at the system level aimed at increasing the privacy of the communication while the numerous users of the system have identical receiving-transmitting subscribers' stations.

One more specific feature of the low-orbit satellite communications systems "Globalstar" and "IRIDIUM" is to be noted, which is associated with the possibility of determining the coordinates by each user from the results of processing the signals coming from a satellite transponder (this is connected mainly with measuring the Doppler frequency in several points of the orbit). This is necessary, first, for the operation of the low-orbit communications system itself because it permits of fixing the user station to a quite definite area on the Earth's surface, and, second, considering the mobility of some user stations, permits the users themselves to establish their position without using specialized navigation means. Not high accuracy of self-location must be listed among the shortcomings of the approach adopted in these systems. On the other hand, a differential method of self-location is known, which is one of the ways for further development of the existing navigation satellite systems of "Glonass" sad "GPS" type. The method resides in that the receiver of one of the said navigation systems is disposed in a reference point with exactly known coordinates. Such a receiver, by receiving signals from a constellation of navigation satellites, solves the problem of assessing the coordinates of the reference point. After comparing the obtained coordinates with the exact coordinates, corrections are calculated, which are transmitted to the navigation information consumers (mainly, to mobile consumers) who are in the vicinity of the reference point at distances within hundreds kilometers. Utilizing the received corrections, the consumers of the navigation satellite systems are capable of improving the accuracy of self-location by one or two orders of magnitude as compared with assessing the coordinates by the navigation satellites only. Implementation of this method is only possible with a developed mobile communications system and with the possibility of ensuring broadcast transmission. Therefore, the subject of the present invention is intended to improve the accuracy of navigation aids for the mobile users of the low-orbit communications system, which widens the potentialities and service properties of the low-orbit satellite communications systems.

The above-mentioned method of establishing communication with the use of "Globalstar" system, allowing the service area widening and calling for the presence of regional stations which ensure going into the network associated with a stationary satellite, makes it possible to provide global communication and can be considered as the most close to the method of multiple-station communication with integration of low-orbit and high-orbit satellite systems.

The communication of two users of the low-orbit system is implemented through the following chain: a user station, a low-orbit transponder, a regional station, a stationary satellite transponder, another regional station, a low-orbit satellite transponder, a user station. In order to establish global communication, another stationary satellite may be needed, which is connected via an intersatellite link with the first stationary satellite.

In this case, with due regard for the signal delay on the time of propagation of radio waves and also because of the numerous reswitchings and rerelayings and also delays in vocoders, the total signal delay will exceed the normal value 0.39 s admissible according to MCCTT, which is a shortcoming of the prior-art method. Listed among other disadvantages must be complexity of the system directly because of the great number of rerelayings and reswitchings, losses in the characteristics of the electromagnetic compatibility (EMC) and noise immunity caused by multiple circulation of signal flows, an insufficient level of unification of the low-orbit and high-orbit communications systems owing to the different principles of their structure (multiple station access, kinds of signals, encoding), narrowing the service area of the low-orbit systems because of the presence of regional stations.

Known in the art is the design of the satellite communications systems which ensure synchronization of both the receivers of the user stations and the transmitters thereof.

The transmitters of the user stations are synchronized due to the auto tuning of the transmitters by the carrier frequency and signal delay (code delay).

There are known two basic types of transponders: those which perform direct relaying of user station signals and those which process the signals on board the satellite transponders. When processing signals at the satellite transponders, a higher noise immunity of the system is provided.

In order to synchronize receiver, and transmitters, use is often made of phase-modulated wideband pseudorandom signals having adequate correlation properties. However, with any signal shapes, measures must be taken on signal search and initial synchronization of receivers and transmitters.

As a result of signal search, narrowing of uncertainty is achieved in evaluating the delay and frequency of the pseudorandom signals to values ensuring the signal capture by correlation tracking systems which include systems of phase (or frequency) auto tuning of frequency and circuits for tracking the delay. It is required to provide the search and initial synchronization of the correlation receiver and transmitter at the user station. The systems of search and initial synchronization of the correlation receivers are described in sufficient detail, for example, in the publication "Interference immunity of radio systems with composite signals", G. I. Tuzov, V. A. Sivov, V. I. Prytkov et al, edited by G. I. Tuzov, M., Radio i svyaz publishers, 1985, pp 115–157. Some of said forms of signal search can be used for search and initial synchronization of the transmitters and communications channel as a whole with the search apparatus disposed at a satellite transponder. In the above-mentioned system, however, the receiver of the satellite transponder becomes seriously complicated and, as a result, the advantage is lost connected with simiplification of the satellite transponder equipment performing auto tuning of all the user stations transmitters. This is attributed to that the search and initial synchronization of the channels need be conducted for the multitute of signals simultaneously arriving from the user stations, and each search period will include, in addition to the time of averaging in the receiver, also the time of propagation of the signal to the satellite transponder and in the backward direction. At the stage of search and initial synchronization of the channels, it is also necessary to have a duplex operation between the satellite transponder and each user station by means of which it will be needed to transmit, from the satellite transponder to the user stations, the information on the instant delay evaluations and signal frequency and to receive the response of each user station, which is not always realizable. Under these conditions, the noise immunity of the communications system in the mode of search and initial synchronization of the channels will obviously be low.

An object of the invention is to provide a method and apparatus for multiple-station communication, which will ensure:

higher noise immunity both through the channels of synchronization and service information transmission and through the channels of the main information transmission;

higher electromagnetic compatibility (intersystem and intrasystem), particularly necessary in repeat use of an engaged frequency band:

increased communication stability including an increase in the area and time of service with considerable dynamics of motion of transponders with respect to the users;

increased privacy of talks and intrasystem electromagnetic compatibility when the users have a large number of identical stations which are randomly disposed;

a decrease in the time of signal search and initial channel synchronization;

a decrease in the time of signal delay along the path of their preparation between the user stations;

simplification and unification of the equipment of satellites transponders and ground-based equipment;

widening of the possibilities of self-location of the communications system users.

This and other objects are accomplished in a method of multiple-station communication for low-orbit satellite systems, comprising the steps of transmitting by user stations synchronization signal and information-modulated signals, reswitching the information-modulated signals aboard a transponder, emitting thereof at different frequencies by beams spaced apart with the use of phase-shift keying, emitting by the transponder its own synchronization signal, receiving the synchronization signal from the satellite transponder by the user stations and the information-modulated signals meant therefor, the method further comprising, according to the invention, generating and emitting, at the satellite transponder, a wideband pseudo-random synchronization signal with phase-shift keying over the entire width of the transmission spectrum from the satellite transponder and over the entire service area divided into cells with the power density gradually increasing from the area center to the edges thereof, modulating said synchronization signal with service information intended for control of the communication system, performing rejection of said synchronization signal spectrum sections coincident, at the time of emission, with the spectrum of signals emitted by the satellite transponder and carrying information, with the emitted power of the synchronization signal being constant, checking at the satellite transponder the location of all the user stations with respect to the spatial cells formed by the beams of an on-board antenna of the satellite transponder, receiving information packets from the user stations and storing the information portion thereof, determining from the packet preambule the carrier-frequency and code-delay mismatches against standards disposed at the satellite transponders, with subsequent storage thereof, retrieving from the memory, shaping and emitting groups of information packets within preset time intervals, meant to be transmitted into different spatial cells with preambles including mismatches for each user station, all the user stations performing reception of the synchronization signal from the satellite transponder and separation of service information with simultaneous rejection of the synchronization signal spectrum portion coincident with the spectrum of the signals carrying information from that spatial cell in which the particular user station is located, performing compensation for the Doppler shift in autotune transmitters using the synchronization signal received from the satellite by the carrier and clock frequencies, transponder, performing auto-tuning of the own transmitters by the carrier frequency and code delay with the use of mismatch values separated from said preambule, sending a query to the transponder on the necessity of communication with other user stations by emitting, by the auto tune transmitters, several cycles of the pseudorandom radio signal with the code assigned for the call of the satellite transponder with a delay individually preset for each of the user stations, identifying at the satellite transponder the number of the calling user station and the spatial cell in which it is disposed by the received call signal and its delay, reporting by means of the calling user station code the time interval alloted thereto and the internal code for two-way communication with the satellite transponder, the number of the called user station identified at the satellite transponder with its coordinates and the spatial location cell being reported to the satellite transponder from the calling user station within the time interval allotted thereto by modulating the internal code, with the called user station being disengaged, a call arrives from the satellite transponder with the use of its subscriber's code, said call presetting at the same time the time interval end internal code for the two-way communication with the satellite transponder, performing the initial synchronization of the auto tune transmitter from the called user station after receiving a call from the satellite transponder, and reporting to the satellite transponder within the alloted time interval on readiness for communication by modulating the assigned internal code and thereafter separating at the satellite transponder and reporting to the two user stations the time intervals and the numbers of the internal codes to establish two-way communication, the time intervals being assigned proceeding from the condition of convenience of routing the packets taking into consideration the cells of location of the user stations, establishing thereafter the internal codes in the transmitter and receiver at each user station, providing information shaping in a digital form and the time compression thereof, performing multibase coding of the information bar the allocated internal code and emitting a signal within the allotted time interval with a preamble including several cycles of the internal code with a fixed delay (or several cycles of the code allotted to a group of user stations), and performing at the user stations separation of the packets intended therefor, demodulation, decompression and separation of information transmitted to the user stations.

It is preferable that in the method of multiple-station communication for low-orbit satellite systems, according to the present invention, the code allotted to the user station for calling the satellite transponder with the delay established individually for each user station is additionally modulated by a short message including information on the number of the called party, with subsequent demodulation and separation of said message at the satellite transponder.

It is expedient that in the method of multiple-station communication for low-orbit satellite systems, according to the present invention, an intersatellite communication is established with neighbour satellite transponders similar to the communication established between the satellite transponder and one of the user stations, each of the satellite transponders performing, in this case, by the principle of constructing the network, both the part of a user station synchronized from the neighbour satellite tranponder and a satellite transponder from which are synchronized other satellite transponders, and the time of exit from the common service area of each of the user stations and from the spatial cell is determined at the satellite transponders, each of the user stations being informed about this, with simultaneous presenting thereto recommendation on switchover to communication with the most favourable satellite transponder at a new frequency and time interval of another spatial beam, whereupon at the user station, simultaneously with maintaining the communication, a synchronization signal is received from the recommended satellite, with establishing a new frequency and time interval and the auto tune transmitter is synchronized from said satellite transponder by frequency and delay, information is transmitted for some time to both the satellite transponders, and matching of the passage of information flows from the user stations in time is provided at the satellite transponders with the use of intersatellite communications lines, and after that synchonous automatic switchover of the user stations is effected to the communication via the new satellete transponder only.

It is preferable that in the method of multiple-station communication for low-orbit satellite systems, several information packets are transmitted by different internal codes in the same time intervals, the levels of the input signals are measured at the satellite transponder, higher-, lower-power signals being compressed are determined and the levels of the power correction are transmitted in the preamble, and the user stations control the power of their transmitters It is also preferable that in the method, according to the invention, information is transmitted, from the users disposed in reference points with precisely known coordinates, about the coordinates of said reference points and the navigation corrections obtained as a result of comparison of the precisely known coordinates with those obtained as a result of estimations from navigation satellites, said information is demodulated at the satellite transponder with subsequent modulation by said information of the synchronization signal emitted from the satellite transponder and demodulation of said information by interested user stations.

It is of benefit that in the method of multiple-station communication for low-orbit satellite systems, according to the invention, at the satellite transponder, navigation information is switched which is obtained from the user stations disposed in reference points with precisely known coordinates, and it is transmitted by each of the spaced apart beams within the predetermined time intervals and the allocated internal codes with subsequent separation of said information by interested user stations.

The above-mentioned and other objects are also achieved in a method of multiple-station communication with integration of high-orbit and low-orbit satellite systems which comprise satellite transponders in stationary and low orbits, which method comprises the steps of emitting synchronization signals and information-modulated signals generated on the basis of wideband pseudorandom signals with phase-shift keying, and also receiving information-modulated signals from low-orbit satellite transponders by means of small-size user stations and synchronization signals, which also comprises, according to the present invention, generating, at high-orbit satellite transponders, a wideband pseudorandom synchronization signal with phase manipulation over the entire spectrum width allotted for information transmission from the satellite transponder with code differentiation of signals generated by different satellite transponders, emitting said signal over the entire common spatial service area divided into cells and including visible orbits of all low-orbit satellite transponders, with the power density gradually increasing from the area center to the edges thereof, modulating said signal with service information, performing rejection of said signal spectrum sections coincident at the emission instants with the spectrum of the emitted signals proper which carry information, with the output power of the synchronization signal being maintained constant, performing reception of signal packets from the low-orbit satellite transponders with storage of the information portion thereof, determination from the preamble of said packets the delay and frequency mismatches against standards disposed at the satellite transponders, with subsequent shaping of preambles from the mismatches, and storage of the preambles at the satellite transponders, performing reswitching of the stored information portions of the packets assigned for the user stations of the low-orbit communications system and packet groups to be transmitted to various spatial cells in which are disposed the corresponding satellite transponders of the low-orbit system, forming partially overlapping spatial emission cells by means of a multi-beam transceiving antenna providing a full coverage of the entire service area, the major axes of said cells being parallel to the directions of motion of the satellite transponders of the low-orbit system, performing control over the current position of the satellite transponders with respect to the spatial service cells, effecting reception of the synchronization signal at the low-orbit satellite transponders with separation of service information, conducting rejection of said signal spectrum section coincident with the spectrum of the packets received at that time, performing reception of the packets of high-orbit satellite transponders with separation of the information assigned thereto, performing, at each of the satellite transponder of the low-orbit system, synchronization of its own transmitter by the delay of the emitted signal code and frequency with the use of the corresponding mismatches from the separated packet preamble and with preliminary compensation of the Doppler shift by the carrier and clock frequencies, the value of said compensation being obtained from the received synchronization signal, forming a beam of the transceiving antenna to the corresponding high-orbit satellite transponder from calculated data of the relative position of the satellite and/or from the estimations of the power maximum of the received synchronization signal, said beam being formed wide in the direction of the satellite transponder motion and narrow in the perpendicular direction, emitting, from a low-orbit satellite transponder, in order to call a high-orbit satellite transponder on a request of a user station of the low-orbit system to establish communication, several cycles of the pseudorandom signal, which are allotted for a call, said signal being synchronized from a common clock generator of a transmitter with a delay individual for each low-orbit satellite transponder, modulating said signal with information on the number of the called user station, identifying the number of the calling satellite transponder by the call signal received at the high-orbit satellite transponder and obtaining information on the number of the called user station, determining for communication the satellite transponder of the low-orbit system and reporting thereto the number of the called user station in the user code of said satellite transponder, receiving the call at the satellite transponder of the low-orbit system, relaying the call to the corresponding user station, and, with the readiness of the station, assigning and transmitting, at the calling and called satellite transponders of the low-orbit system, the internal codes and time intervals from said satellites for two-way communication, which are established by the user stations at the low- and high-orbit satellite transponders.

The above-mentioned and other objects are accomplished also in a method of search and initial synchronization of channels in a satellite communications system with direct relaying of signals, in which wideband pseudorandom signals are used for synchronization, and synchronization of the user station transmitters are carried out by a synchronization signal from the satellite transponder, said method providing emission by each user station, in addition to an information-modulated signal, of its own synchronization signal, reception from the satellite transponder of information-modulated signals and its own synchronization signal, the method further comprises, according to the invention, performing at the user stations, after receiving the synchronization signal of the satellite transponder, unidirectional discrete scanning of the delay of the emitted synchronization signal with preliminary compensation of the Doppler increment by the carrier and clock frequencies, which increment is separated from the received synchronization signal of the satellite transponder, noting the instant of coincidence of the own relayed synchronization signal delay with the delay of the reference signal of the same waveform phased from the synchronization signal of the satellite transponder received by the receiver, varying at that instant the direction of scanning to the opposite, again noting the instants of coincidence of the delays of said signals, ceasing scanning at a K-th instant of coincidence of the delays, calculating the number of the steps of scanning between the first and the K-th instants of coincidence of the delays, then inputting the delays into the emitted synchronization signal in the initial direction of scanning by a value equal to half the calculated number of the scanning steps between the first and the K-th coincidence of the delays, where K=2 with $(\tau/T)<1$ and K=N+1 with $(\tau/T)\geq 1$, where T is the time of exhaustive search of all possible delays of the signal, $\tau$ is the time of propagation of the signal in forward and reverse directions, N is the integral part $(\tau/T)$.

It is preferable that in the method of search end initial synchronization of channels in the satellite communications system, according to the invention, with the a priori known signal delay on the route (or distance to the transponder) a delay is introduced into the emitted signal at the user station with a reverse sign relative to the received synchronization signal, said delay being proportional to $[-(\tau/2)_{ap}\mp\Delta]$, where $(\tau/2)_{ap}$ is the a priori known delay, $\Delta$ is the maximum value of the a priori error in the knowledge of the delay, and scanning is commenced in the direction $\pm\Delta$, the instant of coincidence of the delays is noted of the own relayed signal received by the receiver and of the reference signal of the same waveform phased from the satellite transponder synchronization signal received by the receiver, the discrete delay $2[(\tau/2)_{ap}\pm\Delta]$ is introduced into the emitted signal and scanning is performed in the direction $\mp\Delta$, a new instant of coincidence of the signal delays is noted, the resultant is estimated taking into account the scanning of delay between the instants of coincidence of the delays of the reference and relayed signals, and then a discrete introduction of the delay is performed in the initial direction, said delay being equal to half the resultant delay.

It is also expedient that in the method of the present invention, at the satellite transponder with signal processing, the instants of coincidence of the delays of the synchronization signal emitted by the user station and the reference signal of the same waveform are noted, which reference signal is phased from a generator of the synchronization signal codes disposed at the satellite transponder, and the instants of coincidence of the delays are subsequently relayed by modulating the signal from the satellite transponder, the signal is received and demodulated by the appropriate user stations.

The above-mentioned and other objects are also accomplished in that in an apparatus for implementing the method of multiple-station communication for low-orbit satellite systems, which comprises, at a satellite transponder, a transceiving phased antenna array with a modulator and a high-frequency portion, a receiver of signals of communication and service information, a unit for generating a synchronization signal and a service information signal, a frequency spectrum synthesizer, an antenna for transmitting a signal of synchronization with a high-frequency portion, a unit for packet generating with a buffer memory, a user station including a transceiving antenna with a high-frequency portion of a transmitter, a signal receiver with a high-frequency portion and channels for separating information, a synchronization signal receiver comprising a circuit for phase autotuning of frequency, a delay tracking circuit, interconnected by a cross link, and a channel for service information separation; a transmitter with frequency end code delay autotuning, including a frequency auto tune circuit and a delay tracking circuit, a unit for generating digital information with a device for compressing thereof, a buffer memory and a packet shaper, a control unit, according to the present invention, installed at the satellite transponder between the synchronization signal generating unit and the antenna for transmitting the synchronization signal are rejection filters connected through a control input with a control unit, frequency and delay discriminators are introduced, which are connected to the buffer memory and a preamble shaper and have their input and output connected, respectively, to a linear output of the receiver of communication and service information signals and to an input of the packet generator with the buffer memory, the output of the packet generator being connected to the transceiving phased array with the modulator and high-frequency portion, there ere introduced generators of a synchronization code, internal and user codes controlled from a single clock generator and phased with each other, the internal code generator being connected to the packet generator and frequency and delay discriminators with the buffer memory and the preamble shaper, a receiver of a call of the satellite transponder is incorporated, which is a matched filter connected, through an input, to the receiver of communication and service information signals, and, through outputs, to the control unit and to a user station call generator, a unit for compensating the Doppler shift being installed at the user station, installed between the circuit of phase auto tune of frequency and the signal receiver with the high-frequency portion and information separation channels are rejection filters having their input connected to an output of the control unit; gerators of a synchronization code, user codes and internal codes synchronized and phased between each other are incorporated into the circuit for tracking the delay of the receiver synchronization signal, the internal code generator being coupled to a delay discriminator of the transmitter with frequency and code delay autotuning, introduced into the circuit for tracking the delay of the auto tune transmitter is a code generator for calling the transponder and an internal code generator synchronized and phased with each other and a series combination of a voltage adder, a clock frequency generator and a scanning circuit having its output coupled to an input of the generator of call code of the transponder and the internal codes of the auto tune transmitter, and having its input connected to an output of a circuit for search and initial synchronization of the transmitter having its input connected to an output of the signal receiver with the high-frequency portion and information separation channel, incorporated in the circuit for autotuning the transmitter is a voltage adder having its output connected via a controlled generator, as is the output of the controlled clock frequency generator of the autotune transmitter, to the Doppler shift compensation unit.

The above-mentioned and other objects are further accomplished in that in an apparatus for signal search and initial channel synchronization in a satellite communications system, comprising, at a user station, a circuit of phase auto tune of frequency, including a series combination of a signal receiver with a high-frequency portion, injection filters, a subtractive mixer, a code demodulator with an intermediate frequency amplifier, a phase detector with a lowpass filter, a controlled generator coupled to a reference input of the subtractive mixer, a frequency spectrum synthesizer, a delay tracking circuit, including a series combination of a discriminator with a lowpass filter, a controlled generator, a synchronization code generator connected to a reference input of the discriminator, and generators of transmitter codes (user and internal); a circuit of phase (frequency) auto tuning of the transmitter frequency, including a phase (frequency) discriminator with a lowpass filter, a controlled generator, a modulator and an amplifier of high frequency; a circuit for tracking a transmitter delay code, including a delay discriminator with a lowpass filter, a controlled clock frequency generator, generators of a transmitter code (call of a transponder and internal codes), said transmitter being coupled to a modulator with a high-frequency amplifier, the inputs of of the phase (frequency) discriminator with a lowpass filter and of the delay discriminator with a lowpass filter being coupled to the signal receiver with a high-frequency portion, and the input of the discriminator with a lowpass filter being connected to the output of the subtractive mixer, according to the present invention, a Doppler shift compensation unit is introduced, which is made up of two identical circuits which comprise subtractive mixers; phase detectors with lowpass filters, a voltage adder, the inputs of the subtractive mixer in the first circuit being connected to the outputs of the controlled generator and to the corresponding output of a frequency spectum synthesizer, and the second input of the phase detector with a lowpass filter is connected to the output of the controlled generator, and the inputs of the subtractive mixer in the second circuit being connected to the output of the controlled clock generator and to the corresponding output of the frequency spectrum synthesizer, and the second input of the phase detector with a lowpass filter is connected to the output of the controlled clock frequency generator, said voltage adder of the first circuit being included into the circuit of phase (frequency) auto tuning of the transmitter frequency between the input of the controlled generator and, through a switch K, the output of the phase (frequency) discriminator with a lowpass filter, and said voltage adder of the second circuit being included into the code delay tracking circuit of the transmitter between the input of the controlled clock frequency generator and, through a second switch K, the output of the delay discriminator with a lowpass filter, a circuit for signal search and initial synchronization of the transmitter, which circuit is a series combination of a search correlator and a search mode control unit coupled to a scanning circuit, the input of the search correlator being connected to the output of the signal receiver with a high-frequency portion and to the reference output of the internal code generator of the transmitter, and the second and third inputs of the search mode control unit being connected to the outputs of the controlled clock generator and the reference output of th,e internal code generator of the transmitter, and the control output of the search mode control unit being connected to the switches K, the scanning circuit being connected between the input of the generators of the transmitter code of the transponder call and of the internal codes and the output of the controlled clock frequency generator.

BRIEF DESCRIPTION OF THE DRAWINGS

The invention will be better understood from a consideration of exemplary embodiments thereof taken in conjunction with the accompanying drawings, wherein.

PREFERRED EMBODIMENTS OF CARRYING OUT THE INVENTION

Figure 1:
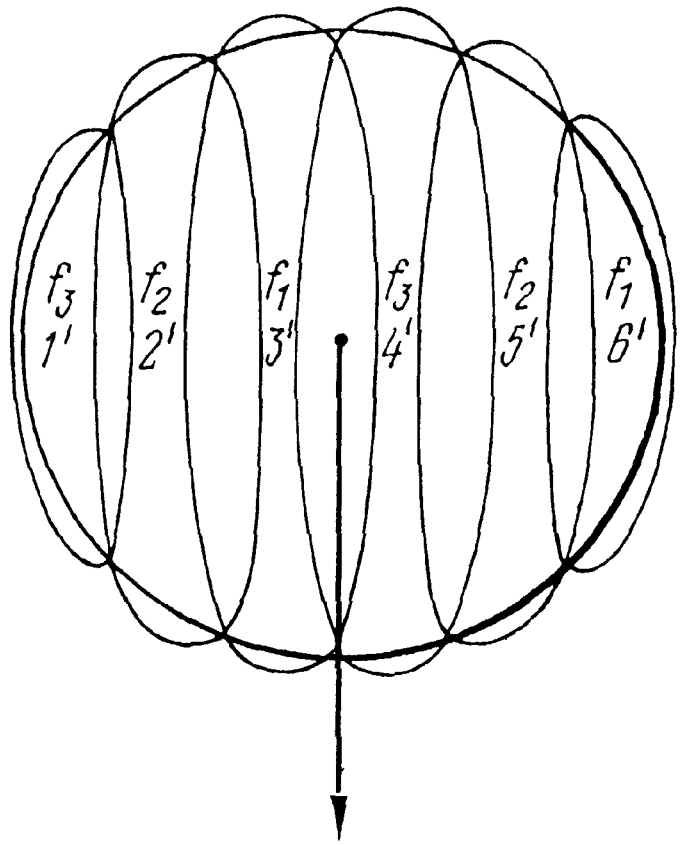
FIG. 1 is an area on the Earth's surface serviced by one satellite the boundary of which is defined by the minimum angle of elevation to the satellite at which communication is still possible and service areas (cells) provided by a phased antenna array (FAA) intended for transmitting (receiving) information at various carrier frequencies (in this embodiment, transmission is effected at the three frequencies—$f_1$, $f_2$, $f_3$, these sixcells are numbered from left to right as 1', 2', 3',4', 5', 6')
Figure 2:
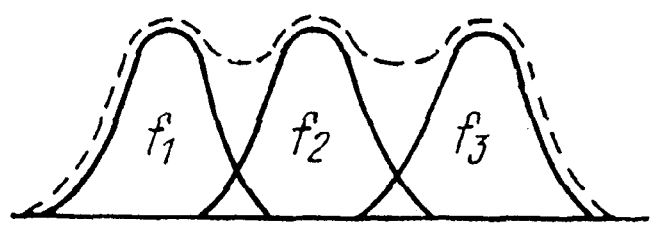
FIG. 2 is a signal band with a widened spectrum carrying information at one of the three frequencies and also a common envelope of the transmission spectrum (or the synchronization signal spectrum envelope of the invention claimed).

It is assumed that in the satellite system, as in the closest prior-art system (analogue), a satellite transponder is provided with a transceiving phased antenna array (PAA), and the service area, in which the satellite is visible at an angle of location not less than the preset one, is divided into 6 (or a greater number) cells in which emission (reception) of signals takes place at various frequencies with time-division operation at each of the frequencies, which reduces mutual interferences. For the sake of clarity, FIG. 1 shows a satellite coverage area divided into 6 cells, information by the satellite transponder being relayed sequentially at the frequencies $f_1$, $f_2$, $f_3$ with spaced apart beams with time division. Reception by the satellite transponder of the user station signals will be effected at the frequencies $f_1'$, $f_2'$, $f_3'$ also with time division with a constant mismatch from the transmission frequencies. Transmission and reception are performed simultaneously in cells 1' and 4' at the frequencies $f_3$, $f_3'$, then in cells 2' and 5' at the frequencies $f_2$, $f_2'$, and then in cells 3' and 6' at the frequencies $f_1$, $f_1'$. For clarity, FIG. 2 shows the spectra of signals with a widened spectrum at the transmission frequencies $f_1$, $f_2$, $f_3$.

The method of the present invention resides in that from user stations are transmitted synchronization signals and information-modulated signals, the information-modulated signals are reswitched on board the transponder, and they are emitted at various frequencies by spaced apart beams (FIG. 1) with the use time-division multiplex and phase manipulation. From the satellite transponder, its own synchronization signal is emitted, which is received by user stations together with the information-modulated signals meant for them. According to the invention, the synchronization signal generated on board the transponder is a wideband pseudo-random signal with phase manipulation occupying the entire band of the information-modulated signal transmitted from the transponder (FIG. 2). The directional pattern of the antenna emitting a synchronization signal must be such as to provide a uniform power density irrespective of the distance from the satellite to the user station, and the boundaries of the service area are determined by a tilt angle at which the satellite transponder is visible by the user stations and the communication can still be maintained. The increased signal bandwidth-duration product is conducive in improving the noise immunity, electromagnetic compatibility and synchronization precision required for implementing time-division multiplex, and at the same time the communications system does without auxiliary widening of the frequency band allocated to the entire system.

The synchronization signal is modulated with service information transmitted to the users and intended for controlling the operation of the entire system.

Special measures have been taken in the invention to decrease the mutual influence of the synchronization signals and information-modulated signals, which ensure their increased orthogonality.

Among such measures are the following: selection of different codes for synchronization signals and information transfer signals, rejection at the satellite transponder of those synchronization signal spectrum portions which coincide at the instant of emission with the spectrum of the information-modulated signals, with the emitted power of the synchronization signal being constant. In addition, all the user stations perform synchronization signal reception and separation of service information with simultaneous rejection of the spectrum portions of the synchronization signal, which coincide with the spectrum of the signals carrying information at the time of their reception boy the user stations which are in different spatial cells. These measures improve the intrasystem EMC with reuse of one and the same frequency spectrum, and also increase interference immunity.

A check on locations of all the users is made at the satellite transponder relative to the spatial cells formed by the beams of the phased antenna array of the transponder. To this end, the users must constantly estimate their coordinates to an accuracy of hundreds kilometers with the use of a subscriber station (or other navigation methods, including those claimed in the invention), and transmit them regularly to the satellite transponder. The coarse coordinates of the location of the users, and also approximate characteristics of the vector of their motion must be stored in the memory of satellite transponder.

Reception is also performed, at the satellite transponder, of packets from the user stations and storage of their information portions, and from the preamble of the packets evaluation is made of the mismatches by the carrier frequency and code delay against standards at the satellite transponders, with their subsequent storage. There are performed retrieval from the memory and shaping of packet groups intended to be emitted to different cells with a preamble in each packet, which contains said values of the mismatches for a particular user station. All the user stations perform compensation in the auto tune transmitters of the Doppler shift by the carrier and clock frequencies using a synchronization signal received from the satellite transponder, effect autotuning of their own transmitters by the carrier frequency and code delay using the values of the corresponding mismatches separated from the preamble.

In order to call another user station, a query is sent to the satellite transponder by emitting with the aid of the auto tune transmitter several cycles of the pseudorandom radio signal with a code assigned for the call of the satellite transponder with a delay preset individually for each of the user stations. At the satellite transponder, the number of the calling user station and the spatial cell in which it is located are identified from the call signal received and its delay, and the time interval allocated to the calling user station end the internal code for two-way (with the transponder) communication are reported by means of the calling station code. The calling user reports in the time interval allocated to this user, to the satellite transponder the number of the calling user station by modulating the internal code identified at the satellite transponder with its coordinates and the spatial location cell. With the called subscriber being disengaged, using the user's code a call arrives from the satellite transponder, which simultaneously sets the time interval and internal code for two-way communication with the satellite transponder. The called subscriber, on receiving the call from the satellite transponder, performs the initial synchronization of the auto tune transmitter and in the allocated time interval using said transmitter reports to the transponder on the readiness for communication by modulating the separated internal code. After that the time intervals and numbers of the internal codes are established at the satellite transponder and reported to the two user stations to establish two-way communication, the time intervals being separated on the condition of convenience of routing the packets taking into account the cells of the users' location. Then, each user establishes the internal codes in the transmitter and receiver, ensures information generation in a digital form and its time compression, performs its multibase coding by the separated internal code and signal emission in allocated time interval with a preamble including several cycles of the internal code with a fixed delay ( or several cycles of the code allocated to a group of subscribers).

An increased interference immunity, privacy of talks and improved EMC, less intricate equipment are provided in the method of the invention due to realizing multiple-station access with time division multiplex (MATM) in combination with multiple-station access with code division multiplex (MACM), and also frequency and space division. The high accuracy of synchronization, necessary for MATM, is provided due to the use of synchronization signals with a higher band and band-width-duration product than in the prior-art method. Moreover, according to the invention, relatively short quasiorthogonal internal codes are introduced, which are allocated individually to each subscriber with the recommended number M of the code elements in the range from 64 to 8192. These codes ensure block multibase information coding. The internal codes for transmission and reception are allocated by the user from the satellite transponder for one (or several) communication session. All the above-mentioned measures increase interference immunity with interferences created by the equipment of other subscribers both with incorrect use of the equipment and with mulfunctions therein, and also in the case of interferences created intentionally, and therefore excludes interceptions without useing special means. Additional employment of special means for cryptosecurity of information is conducive to improving the privacy of talks. Additional use of convolutional codes is neither excluded.

With a view to more economically use the frequency band, it is recommended in each time interval to place and transmit signals with information packets from several subscribers, which are different in the waveform, the number of which will rise with a greater M.

The maximum interference immunity of reception will be ensured when the power of the multiplexed signals is equalized, which is attained as a result of measurement of the levels of the multiplexed signals within each time interval, separation of the signals with the maximum and minimum levels with respect to the average value and transmission of recommendations in the preamble of the packets on decreasing or increasing the power of the transmitters of the corresponding users. Having received the preamble, the users regulate the power of the transmitters.

Increase in the stability of the communications system operation with great dynamics of motion of the satellite transponders relative to the users, additional improvement of interference immunity and simplification of the equipment are provided by that in the user station equipment, evaluation of the Doppler shift is made from the synchronization signal received from the satellite by the carrier and clock frequencies, the obtained evaluations are introduced with an opposite sign into the autotune transmitter (into the circuit of frequency tracking and signal delay).

This procedure ensures:

stable operation of the transmitter even with considerable interruptions (pauses) in emitting its own signal;

narrowing of the transmission bands of the circuits for tracking the carrier and signal delay of the transmitter and, hence, improvement of its interference immunity.

Moreover, according to the invention, a special procedure of calling the transponder by the subscribers in which after emitting to the satellite transponder a special phased code sequence common for groups of subscribers, the user station ready to establish communication with the satellite transponder or other subscriber is identified at the satellite transponder from the delay of this sequence individual for each user station.

Introduction of such a procedure reduces the amount of information bits required for ensuring a call of of the satellite transponder by any subscriber at any time with an arbitrary number of the subscribers willing to establish communication, with the interference immunity being increased.

In order to implement this procedure, it is required to have at the satellite transponder only one matched filer (or their small number), which makes the satellite transponder more simple. In addition, it is expedient to introduce for each user his own code which can transmit call from the satellite transponder of any user station and individual service information. To this end, it is necessary to have at the satellite transponder a user code generator synchronized from a common clock generator, and to have at the user station the simplest correlator tuned to this code.

One of the specific features of the invention is the possibility afforded to the subscribers to transmit to the satellite transponder, together with a call from the satellite transponder, short messages including information on the number of the called user station, which simplifies and accelerates the procedure of establishing communication between the subscribers. For this purpose, the call code with a delay individual for each user is additionally modulated by this message.

One of the aspects favouring the solution of the stated problem is the process of synchronizing the auto tune transmitter, and also generating an information message to the subscribers. Analog information which is to be transferred to the subscribers, after quantization digitization, time compression, multibase coding is emitted within the allocated time interval with a preamble which includes one-two cycles of the user's own internal code (it is possible to have the own code for a group of users). As a result of the preamble processing at the satellite transponder, evaluation of the code delay and signal frequency against the onboard standards (onboard synchronization signal) which place in the preamble in a digital form the signals transmitted to the corresponding user stations. In turn, the user stations receive said mismatch evaluations and use them in the auto tune transmitter.

An important specific feature of the invention is giving up regional terrestrial stations and developing intersatellite communications. This allows an abrupt enlargement of the terrestrial service area, increase of the time of stable communication of the users and interference immunity, improvement of EMC, reduction of the number of relayings, decrease of the time delay of a signal during its propagation along the route. A single disadvantage of such a solution is associated with a more intricate transponder design. Therefore, the inventions suggests new technical solutions which make it possible to make the transponder desing more simple.

The principles underlying the intersatellite communications, according to the invention, are the same as those of the communications between a satellite transponder and a user station. In this case, each of the satellites transponders in the communication network can perform either the function of a driven satellite (as if the function of a user station) synchronized from a neibouring satellite, or a drive satellite from which other satellites are synchronized. A criterion, for example, can be created according to which the satellites flying in front of and on the right (as viewed in the direction of motion) perform the part of the drive satellites, and those in the rear and on the left are driven. In addition, the functions of the satellites can be determined on the Earth from the communications system control center. With such an organization of the intersatellite communication, there are preserved the principles of design of the equipment on the satellite transponder and user station already described above, which ensures succession, reduction of the development costs, unification and simplification of the equipment.

The intersatellite communication can be efficient and sufficiently easily practicable with a small number of relayings (not more than three). However, even with such restrictions, the service area is drastically increased.

A next specific features is associated with ensuring continuity of communication when change-over to the operation with another satellite is made. For this purpose, at the satellite transponders it is necessary to estimate the operating conditions of the user station, in particular, to estimate the time of exit of the user stations from the visibility zone of the particular satellite. The subscriber must be noticed about it over the service communication and he must be given recommendation to change-over to the operation with another most favourable satellite to continue the communication. Realization of such a procedure at the user stations is not excluded. In that case, duplex communication is continued to be maintained at the user station, and at the same time reception of a synchronization signal from another satellite is made using the other equipment halfset, the auto tune transmitter is synchronized from this satellite, and then transmission is performed to the two satellite simultaneously. Matching in time of information flows passing through the two satellites is ensured at the same time at the said satellite transponders via an intersatellite communication line, and synchronous automatic transfer of a subscriber (subscribers) to the operation with another satellite.

A fourth specific feature is connected with ensuring a multiple-station global personal communication for the subscribers using small-size user stations with the minimum number of re-relayings, signal reswitching and the least signal delays on the route of their transmission.

For this purpose, intersatellite communications lines are organized between stationary satellite transponder and satellites transponders of the low-orbit system, which are within the visibility zone of the stationary satellites. Communication organization in this case is the same as in the low-orbit communications system, namely, the stationary satellite is the drive satellite transponder emitting its own synchronization signal as does the satellite of the low-orbit system, the common service area of the stationary satellite transponder includes all low-orbit satellite transponders visible thereto, the major axes of the spatial cells formed by the phased antenna array are parallel to the directions of motion of the satellite transponders of the low-orbit system, which as if perform the functions of the user stations in the low-orbit system. The synchronization signals of different stationary satellites differ in the code shape.

Such an approach makes it possible to extend a number of advanced features of the purely low-orbit communications systems to cover communication at a global level allows of simplifying and unifying the equipment of the satellite-transponders, increases versatility of the entire communications system, prevents recoding of signals on board the satellite transponder.

A further specific feature is connected with an increase in the traffic-handling capacity of the system and provision of interference immunity with signal compression. This is attained by placing within each time interval several signals having different internal codes but equal power at the transponder input. In order to ensure interference immunity on board the satellite transponder, evaluation of the power levels of the signals in each time interval is performed, signals are determined with lower and higher power and in the preamble of the packet recommendations are transmitted to the subscribers on power level correction performed by said subscribers.

One more specific feature is associated with realizing the differential navigation method for which communication is required, which is capable of transmitting navigational information from a stationary reference point by several mobile objects simultaneously.

The user station located in the vicinity of the reference point transmits navigational information within the interval allocated thereto with the use of the internal code, which is received on board the transponder and must be circularly transmitted to mobile subscribers. Two versions of implementing the conference communication are possible:

(a) information is separated at the satellite transponder, then the synchronization signal of the satellite transponder is modulated with this information and its separation by the interested users is effected as it is done for providing service communication;

(b) the packets carrying navigational information are received at the satellite transponder, are switched and transmitted by spaced apart beams in the allocated time intervals by means of the internal codes into different spatial cells. This approach essentially results in that the directions of transmission of the packets are multiplied by their switching.

And, finally, one more specific feature is connected with signal search and initial synchronization of channels in the low-orbit communications system. As a result of the signal search, narrowing of uncertainty is achieved in evaluating the delay and frequency of pseudorandom signals to a value which ensure signal coverage by correlation tracking filters including systems of phase and frequency auto tuning of frequency and circuits for tracking the delay of a highband pseudorandom, signal. It is necessary to ensure at the user station search and initial,.synchronization of both the correlation receivers and the correlation transmitters.

Systems for search and initial synchronization of correlation receivers are known in the art, and a described, for example in the publication "Interference immunity and radiosystems with composite signals" by G. I. Tuzov, V. A. Sivov, V. I. Prytkov et al. Edeted by G. I. Tuzov, M.; Radio i svyaz publishers, 1985, pp 115–157. Some of the system forms discussed in this publication are applicable for search and initial synchronization of the transmitters and communication channel, with the search device disposed on the satellite transponder. In this case, however, the receiver of the satellite transponder becomes drastically complicated, and, as a result, an advantage is lost, which is associated with simplification of the satellite transponder equipment with auto tuning of the transmitters of all user stations, and the time of signal search is increased. This is due to that the search and initial synchronization of channels must be made for a plurality of simultaneously arriving signals of the user stations, and each cycle of the search sill include, in addition to the time of averaging in the receiver, the time of signal propagation from the satellite and back. At the step of search and initial synchronization of channels, duplex communication will be required between the satellite transponder and each user station, by means of which it is necessary to transmit, from the satellite transponder to the user stations, information on instantaneous evaluations of the code delay and signal frequency and to receive a response of each user station, which is not always feasible. Under these conditions, the interference immunity of the communications system in the mode of search and initial channel synchronization will be low. Therefore, the proposed solutions imply simplification of the satellite transponder by excluding the equipment of search and initial synchronization of channels, decrease of the time of the initial synchronization of the transmitters of the user stations and the communication channel as a whole, increase of the interference immunity of the communications system in the mode of search and initial synchronization.

Two forms of the communications system are considered, namely, where a transponder is used on the satellite transponder with direct re-relaying of the user station signals for search and initial synchronization, and also a transponder with signal processing on board the satellite transponder, which covers completely the possible forms.

At first it is assumed that in the communications system use is made of the satellite transponder with direct re-relaying of the signals, and for the satellite transponder with on-board signal processing, only the differences will be considered. It is considered herewith that synchronization of transmitters or the communication channel as a whole is only possible after synchronization of the user station transmitters is completed.

The method resides in that in the system of satellite communication use is made of wideband pseudorandom signals, and synchronization of the user station receivers is performed by a synchronization signal from board the satellite transponder. There is envisaged that each user station emits, beside an information-modulated signal, its own synchronization signal. Then, information-modulated signals and its own synchronization signal used for synchronizing the transmitter are received from the satellite transponder. After receiving the synchronization signal of the satellite transponder, unidirectional discrete scanning of the delay of the emitted synchronization signal is effected with preliminary compensation of the Doppler increment by the carrier and clock frequencies, which is separated from the received synchronization signal of the satellite tranponder. The instant of coincidence of the delay of the own relayed synchronization signal with the delay of the reference signal of the same waveform phased from the synchronization signal of the satellite transponder received by the receiver is fixed. The direction of scanning is simultaneously changed to the opposite and the instant of coincidence of the delays of said signals is again fixed, the scanning is ceased at the K-th instant of coincidence of the delays, calculation of the number of the scanning steps between the first and the K-th instant of coincidence of the delays is performed, then the delays are inputted into the emitted synchronization signal in the initial direction of scanning bar a value equal to half the calculated number of the scanning steps between the first and the K-th coincidence of the delays, where K=2 with $(\tau/T)<1$ and K=N+1 with $(\tau/T) \geq 1$, where $\tau$ is the time of propagation of the signal in direct and reverse directions, T is the time of exhaustive search of all possible delays of the signal, N is the integral part $(\tau/T)$.

The novel steps associated with channel synchronization are as follows:

1. Compensation in the signals, emitted by the transmitters of the user stations, non-permanent Doppler increment by the carrier and clock frequencies.

The Doppler increments are evaluated from the synchronization signal received by the subscribers from the satellite transponder, and is introduced into the transmitter carrier and clock frequencies with an opposite sign. In this case, if the synchronization signal frequencies of the transponder are close to the transmitter frequencies of the user stations, the compensation frequencies are obtained directly from the received synchronization signal; if the frequencies for transmission and reception are different, the compensation frequencies can be obtained after the Doppler increment is recalculated via a coefficient defined by the ratio of the user signal frequencies for transmission and reception.

2. Unidirectional discrete scanning by the delay of the signal emitted by the user station with a step multiple of the signal correlation interval and with a frequency of switching to a new step, which is defined by the time of signal storage at each step. With such a scanning, the moment always comes when the signal of the user station transmitter relayed by the satellite transponder and received by the same subscriber coincides in the delay with the reference signal of the same waveform, which is preliminarily phased from the receiver operating from the synchronization signal of the satellite transponder. Such coincidence occurs in time $\tau$ equal to the time of propagation of the transmitter signal in a direct and reverse directions.

3. Fixation of said coincidence moment of the signal delays.

4. Changing the direction of scanning to the opposite at the moment of coincidence of the delays of the received own signal and the reference signal.

5. New fixation of the coincidence moment of the delays of said signals after which the number of the scanning steps is evaluated between two fixations of the coincidence moments of the delays.

6. Introduction of the delay into the emitted signal in the initial direction of scanning by a value equal to half the number of the scanning steps of the first and second coincidence of the delays of the received own and reference signals, with $(\tau/T)<1$, where T is the time of exhaustive search of all possible signal delays, $\tau$ is the time of propagation of the signal, and with $(\tau/T)\geq 1$, calculation of the number of the scanning steps is made between the first and the N+1-th coincidence of the delays.

Further decrease in the time of initial synchronization of the channel with the a priori knowledge by the subscriber of the time of propagation of the signal from the subscriber to the transponder. In this case, if the delay (relative to the received synchronization signal) is introduced into the emitted signal, which delay is proportional to $[-(\tau/2) \text{ a pr} \mp \Delta]$, where $(\tau/2)$ a pr is the a priori known time of propagation of the signal in a forward direction and $\Delta$ is the maximum error of the a priori evaluation of the delay, and the scanning is commenced by the emitted signal delay in the direction $\pm\Delta$, then the number of the scanning steps up to the first instant of fixing the moment of coincidence of the delays can be reduced.

Further, after fixing said coincidence instant of the relayed and reference signals at the user station the discrete delay $2[-(\tau/2) \text{ a pr} \pm\Delta]$ is again introduced in the emitted signal and scanning is performed in the direction $\mp\Delta$ up to a new instant of coincidence of the delays of said signals. In this case, the use of the a priori value of the signal delay along the route of propagation permits of reducing the region of search end, thus, reducing the time of search and channel synchronization. Then, evaluation of the resultant delay is performed (with regard for the discretely introduced and obtained delay as a result of scanning), and a delay is introduced, equal to half said resultant delay, into the emitted signal in the initial direction of scanning.

We now consider the procedure of search and initial synchronization of the channel when processing signal on board. As it has been noted before, it is necessary to have, on the satellite transponder for the mode of traching the delay and frequency of the signal, code and frequency discriminators, and the mismatches measured by them are transmitted to the user stations in the preamble. It is necessary to have a code generator on board the satellite transponder, which generates all code sequencies received in the communications system. Said components required for traching the signal frequency and delay can also be used for the mode of search and initial synchronization. It is not necessaey to make the satellite transponder more complicated for the initial synchronization, it is only required to alter the search procedure, which includes fixing the coincidence instants of the delay of the synchronization signals emitted by the subscribers, and the reference signals of the same waveform, which are phased directly from the synchronization signal generator of the satellite transponder, which procedure is carried out on board.

Then, the instants of coincidence of the delays are transmitted to the corresponding user stations and are separated by them. For fixing the instants of the delay coincidence, use can be made of the already available delay discriminators, located on the transponders, and for transmitting information on coincidence of the delays the same transmission channel is used as that for transmitting mismatches intracking the delay.

Hereinbelow the method of mutiple-stations communication for low-orbit satellite systems is illustrated by describing by way of example an apparatus for implementing thereof.

Figure 3:
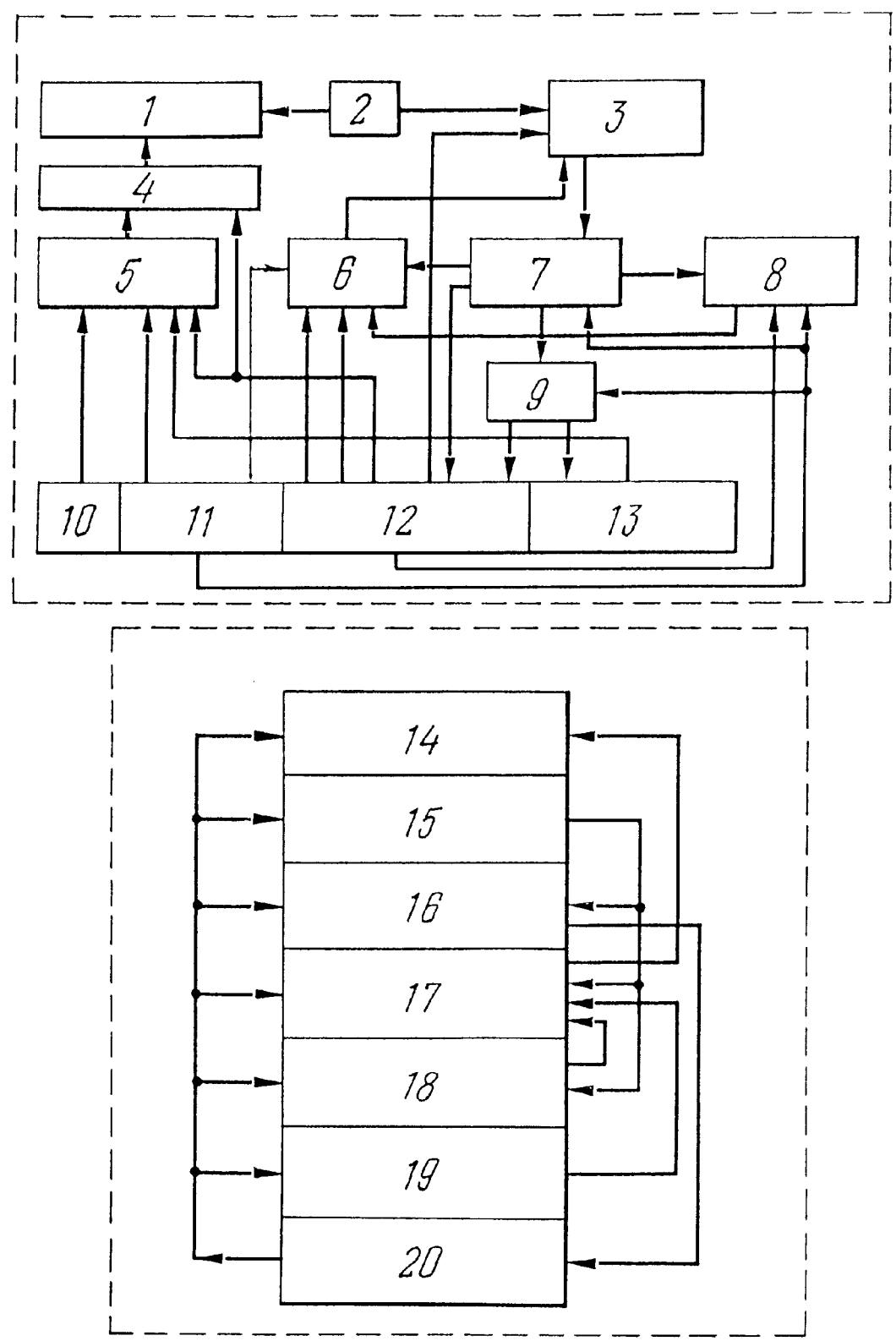
FIG. 3 is a block diagram of the receiving and transmitting equipment of the satellite transponder and user station.

FIG. 3 shows the block-diagram of the apparatus comprising the equipment units of a satellite transponder (1 to 13) and the equipment units of a user station (14 to 20): 1. Antenna for transmitting a synchronization signal with a high-frequency portion. 2. A frequency spectrum synthesizer. 3. A transceiving phased antenna array. 4. Rejection filters. 5. A unit for generating a synchronization signal and service information. 6. A unit for packet shaping with a buffer memory. 7. A signal receiver of communication and service information. 8. Frequency and delay discriminators with a buffer memory and a preamble generator. 9. A receiver of a call from the satellite transponder. 10. A clock generator. 11. Code generator (synchronization, internal, user codes). 12. A control system with an onboard digital computer (ODC). 13. A generator of call to a user. 14. A transceiving antenna with a high-frequency portion of the transmitter. 16. Rejection filters with a synchronization signal receiver and a channel for separating service information. 17. A transmitter with frequency and code delay auto tuning. 18. A Doppler shift compensation circuit. 19. A unit for generating digital information with a device for compressing thereof, a buffer memory and a packet shaper. 20. A control system.

Figure 4:
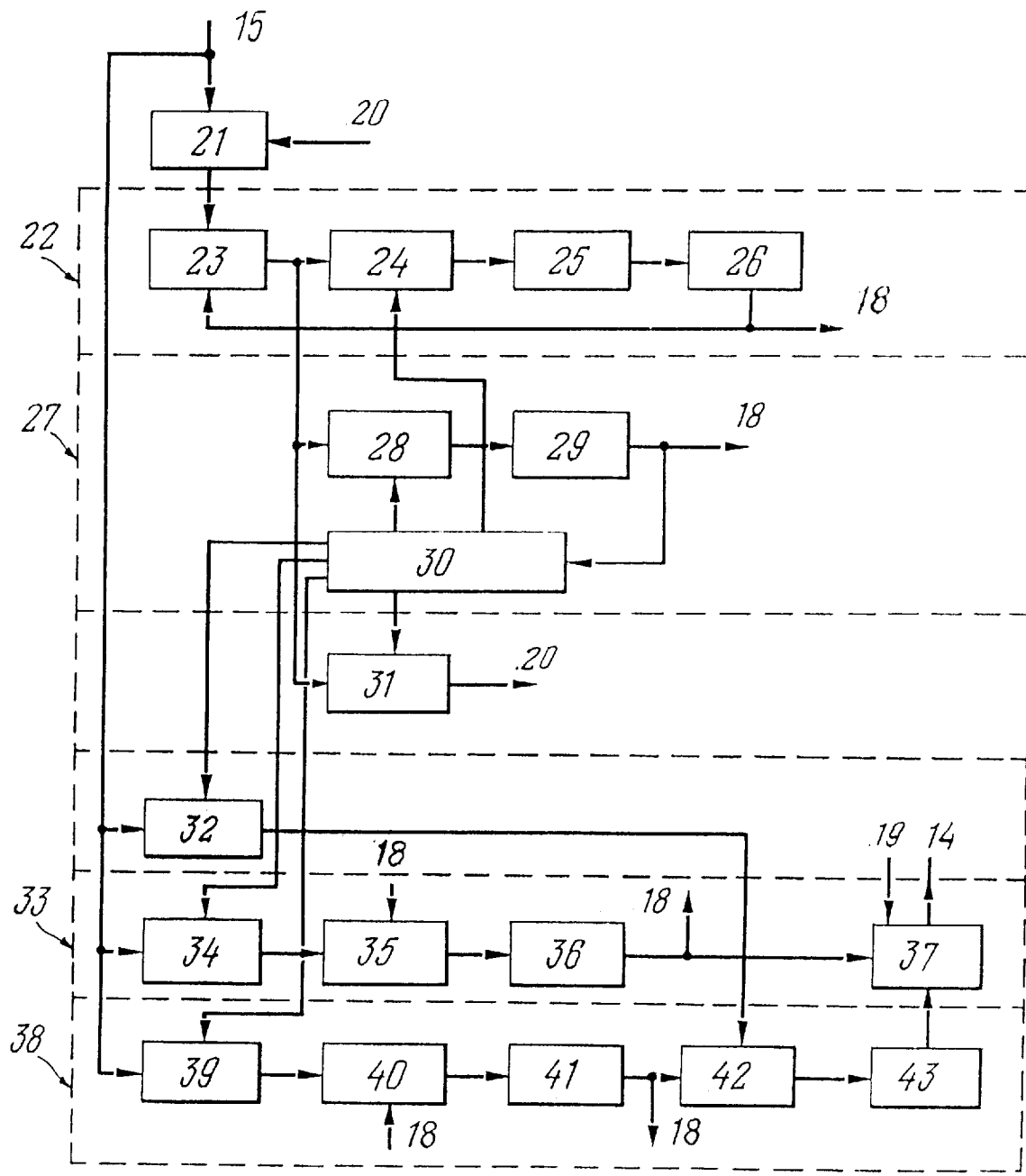
FIG. 4 is a functional diagram of units 16 and 17 of the equipment of the user station in more detail.

FIG. 4 presents more detailed functional circuits of the two units, that is, unit 16 and unit 17.

The unit 16 comprises:

21. Rejection filters. 22. A circuit of phase auto tuning of frequency, comprising units 23 to 26. 23. Subtractive mixer. 24. A code demodulator with an intermediate frequency amplifier. 25. A phase detector with a lowpass filter and a reference generator. 26. A controlled generator. 27. A delay tracking circuit (DTC) including units 28 to 30. 28. A discriminator with a lowpass filter. 29. A controlled clock generator. 30. A code generator including a synchronization code generator, a user code generator, an internal code generator and a transponder call code. 31. A service information separation channel.

The unit 17 comprises:

32. A circuit for search and initial synchronization of the transmitter. 33. A circuit of phase (of frequency) auto tuning of frequency, including units 34 to 37. 34. A phase (or frequency) discriminator with a lowpass filter. 35. A voltage adder. 36. A controlled generator. 37. A modulator. 38. A delay tracking circuit (DTC) including units 39 to 43. 39. A delay discriminator with a lowpass filter. 40. A voltage adder. 41. A controlled clock frequency generator. 42. A scanning circuit. 43. A code generator of the transmitter including a generator of call codes of the transponder and a generator of internal codes.

The antenna (1) for transmitting the synchronization signal with a high-frequency portion must provide a uniform power of the signal on the Earth's surface over the entire service area defined by a preset tilt angle of the satellite visibility irrespective of the distance from the transponder. The shape of the directional diagram of the antenna is such that is ensures minimum amplification in the central region of the diagram and maximum amplification towards its edges.

The antenna is coupled to the frequency spectrum synthesizer (2) and rejection filters (4). The rejection filters (4) are connected through inputs with the control system (12) with ODC, and also with the unit (5) for generating a synchronization signal and service information. The rejection filters (4) perform rejection of the spectrum portions of the synchronization signal, which coincide with information-carrying signals emitted at a given instant of time, and are connected through a control input to the control system with ODC, (12).

In this case, the rejection of the spectrum portions of the synchronization signal must not influence the total power of this signal, which is emitted by the antenna end remains constant. The transceiving phased antenna array (PAA) (3) with a modulator and a high-frequency portion is connected to the receiver (7) of the communication and service information signals and also to the unit (6) for packet shaping with a buffer memory, which unit through a control unit is connected to the control system (12) with ODC.

The packet shaping unit with a buffer memory stores and generates information packets emitted in different spatial cells. Each packet has a preamble containing estimations of the errors by delay and frequency, which are formed by the frequency and delay discriminators (8) with a buffer memory and a preamble generator, after which the evaluations are also written in the buffer memory of the unit (6). Control and synchronization of the operation of the units (6), (7), (8) take place from the control system (12) with ODC. The receiver (7) of communication and service information signals is also connected to the input of the receiver (9) of a call of the satellite transponder, which is a matched filter tuned to the call code. The call codes shaped by the unit (17) of the user station equipment differ from each other in delay. Therefore, the board call receiver (3) is connected to the control system (12) with ODC, which receiver ensures evaluation of the delay of the code received by the code receiver (9), and thereby the number of the user station calling the satellite transponder is identified. Entered into the ODC memory of the control system (12) ere coarse coordinates of each user station, owing to which the zone (cell) is also determined in which a particular user is located. After that, the calling user station is assigned and reported, by means of the units (5, 11, 12) its own internal code in which information is received on the called user station, and then a call is formed to the user station (if it is not engaged) by means of the generator (13) of the call to subscribers, which is connected to the unit (5). The code generator (11) (synchronization, internal and user codes), the control system (12) with a ODC, the generator (13) of the call to a user station are strictly synchronized from a single clock generator (10), end, moreover, the generators of synchronization codes, internal codes and user codes are phased with each other.

In the equipment of a user station, operation and synchronization of all units (14) to (19) are performed from the control system (20) which includes a control digital computer. In particular, the mode of operation in time of the transceiving antenna (14) with a high-frequency portion of the transmitter for reception and transmission is also defined by the control system (20). From the output of the transceiving antenna (14), the signals from the transponder arrive at the signal receiver (15) with a high-frequency portion and information separation channels. The information separation channels are essentially a set of correlators the number of which is equal to the base of the received code, and are connected through an output to a decision-making-circuit. The internal codes arrive to the reference inputs of said correlators from the unit (30) (FIG.4). The input of the synchronization signal receiver is connected to the input of the antenna (14) through the rejection filters (21). These filters controlled from the control system (20) reject a portion of the synchronization signal spectrum at the instants of time when signals arrive at the receiver input, which carry information from the cell there the particular subscriber is located. The synchronization signal receiver is a tracking filter including two circuits, namely, a circuit (22) of phase (frequency) auto tuning of frequency end a circuit (27) of tracking a signal delay which are interconnected by cross links. Various forms of the tracking receivers are described in the publication "Interference immunity of radio signals" (edited by G. I. Tuzov - M., Radio i svyaz publishers, 1985, pp 115–141). The circuit (22) for phase auto tuning of frequency (PAT) comprises a series combination of the subtractive mixer (23), the demodulator (24) of code with an intermediate frequency amplifier (IPA), a phase detector (25) with a lowpass filter and a reference generator, a controlled generator (26) connected to the reference input of said subtractive mixer (23). The delay tracking circuit (DTC) (27) connected to the output of the mixer (23) comprises the delay discriminator (28) with a lowpass filter having its reference inputs connected to the outputs of the code generator (30), the controlled clock generator (23) connected to the code generator (30), and the code generator (30) includes a synchronization code generator, a user code generator and an internal code generator which are phased with each other. The synchronization code generator (30) is connected to the service information separation channel (31).

The conventional frequency and code delay auto tune transmitter (17) is described in the publication "Interference immunity of radio systems with composite signals", edited by G. I. Tuzov - M., Radio i svyaz publishers, 1985, pp 130–132. The auto tune transmitter includes a circuit (33) of phase (or frequency) auto tuning of frequency (PAT or FAT), and also the circuit (38) for code delay tracking (DCT).

The circuit (33) includes the phase (or frequency) discriminator with a lowpass filter, which is connected via a reference input, to the internal code generator (30), and, via the output, to a chain including the voltage adder (35), the controlled generator (36) and also the modulator (37) which is coupled to the transceiving antenna (14).

The circuit DTC comprises the delay discriminator with a lowpass filter, which discriminator is connected, via reference inputs, to the the generator (30) of the receiver internal codes, and, via an output, to the chain: the voltage adder (40), the clock frequency controlled generator (41), the scanning circuit (42), the code generator (43) comprising a generator of call codes of the transponder and a generator of internal codes.

The Doppler shift compensation circuit (18) ensures compensation of the Doppler shifts, respectively, by the carrier and clock frequencies in the auto tune transmitter (respectively, in the circuits (33) of PAT (or FAT) and DCT (38)), separating the Doppler increments by the carrier and clock frequencies from the synchronization signal received by the receiver (16). If we introduce these increments with an opposite sign, respectively, into the controlled generators (37, 41) bar the carrier end clock frequencies of the auto tune transmitter to the voltage adders (35) and (40), then at the input of the transponder these frequencies will be close to their nominal values.

The operation of the apparatus is effected in the following manner. Generation and emission of a wide-band psudorandom synchronization signal are performed at the satellite transponder over the entire spectrum of transmission from board and over the entire region of visibility by the users of the satellite, the visibility increasing gradually from the region center towards its edges. The users users ensure the synchronization signal search by frequency and delay, and then perform synchronous tracking the synchronization signal by means of a two-circuit tracking filter (the frequency tracking circuit (22) and the delay tracking circuit (27)). Reception of service information is also possible by means of the unit (31). The operation of the transmitting PAA (3) is controlled from the control system (12). On board the transponder the synchronization signal is modulated with information and, by a command from the control system (12), the portions of the synchronization signal spectrum which coincide at the instants of emission with the spectrum of the signals emitted by the transponder are rejected, the latter signals carrying information at a constant emitted power of the synchronization signal. When a synchronization signal and service information are received from, board, a simplex (onboard user) is in fact ensured, and the user is ready to take a call of another user. The calling party performs compensation of the Doppler shift by the carrier and clock frequencies by means of the compensation circuit (18), carries out initial synchronization of the own auto tune transmitter (17) using the circuit (32) for search and initial synchronization of the transmitter, and then changes over to the mode of synchronous tracking the signal parameters by the transmitter. Evaluation of mismatches is then performed at the satellite transponder in the frequency and delay discriminators (3), the mismatches are transmitted by means of the units (6) and (4) to the calling party, are separated at the user station by the units (34) and (39), after which the mismatches are operated upon in the auto tune transmitter (17). Then, a call is made to the satellite transponder on the necessity of communication with other subscribers by effecting emission by means of the auto tune transmitter of several cycles of a preudorandom radio signal with the code assigned for calling the satellite transponder and with the delay assumed beforehand individually for the particular subscriber. On board the transponder the number of the calling party is determined by means of the units (4), (7), (9), (12) from the received call signal and its delay, and the code of the particular subscriber is used to report to the subscriber the time interval and internal code allocated for him for a two-way (with the transponder) communication. The calling party reports to the transponder, within the time interval allocated to him, by modulating the internal code of the transmitter in the unit (37), the number of the called party identified at the transponder with the coordinates and the spatial cell of the location thereof, and a call is made from the transponder (with the calling party being disengaged) in the particular user code, and the time interval and internal code are reported to him for the two-way communication in the transponder. The invention also provides the possibility of modulating with a short message the code of calling the transponder by each subscriber. This short message may also contain information on the number of the called party. In this case, no necessity arises to allocate the code and time interval for the user-transponder communication, which somewhat simplifies the procedure of establishing communication between two users. The called party, having received the call, performs the initial synchronization of the own auto tune transmitter (17) by preliminarily conducting compensation of the Doppler shift in the transmitter by means of the unit (18) and within the assigned time interval reports to the transponder on the readiness of communication by modulating the assigned internal code. Having received this message, time intervals and internal code numbers are determined at the transponder by means of the units (7), (8) to organize a duplex, these time intervals being assigned on the condition of convenience of routing the information messages in forming packets for definite spatial cells in which the users are located. After that each user sets the assigned internal code in the transmitter and receiver, ensures time compression of the transmitted information by means of the unit (19), performs its multibase encoding by the internal code, and also shaping and emitting a signal within the assigned time interval with a preamble in which one or two cycles of the internal code with a fixed delay (or several cycles of the code specially allocated for synchronizing a group of users) are transmitted. At the satellite transponder, by the signal of the preamble, evaluations of the mismatches are effected by the code delay and frequency against the onboard standards by means of the unit (8), these evaluations are transmitted into the unit (6) which shapes information packets with new preambles intended for the corresponding users, which are emitted by the satellite transponder and separated by the user stations.

Figure 5:
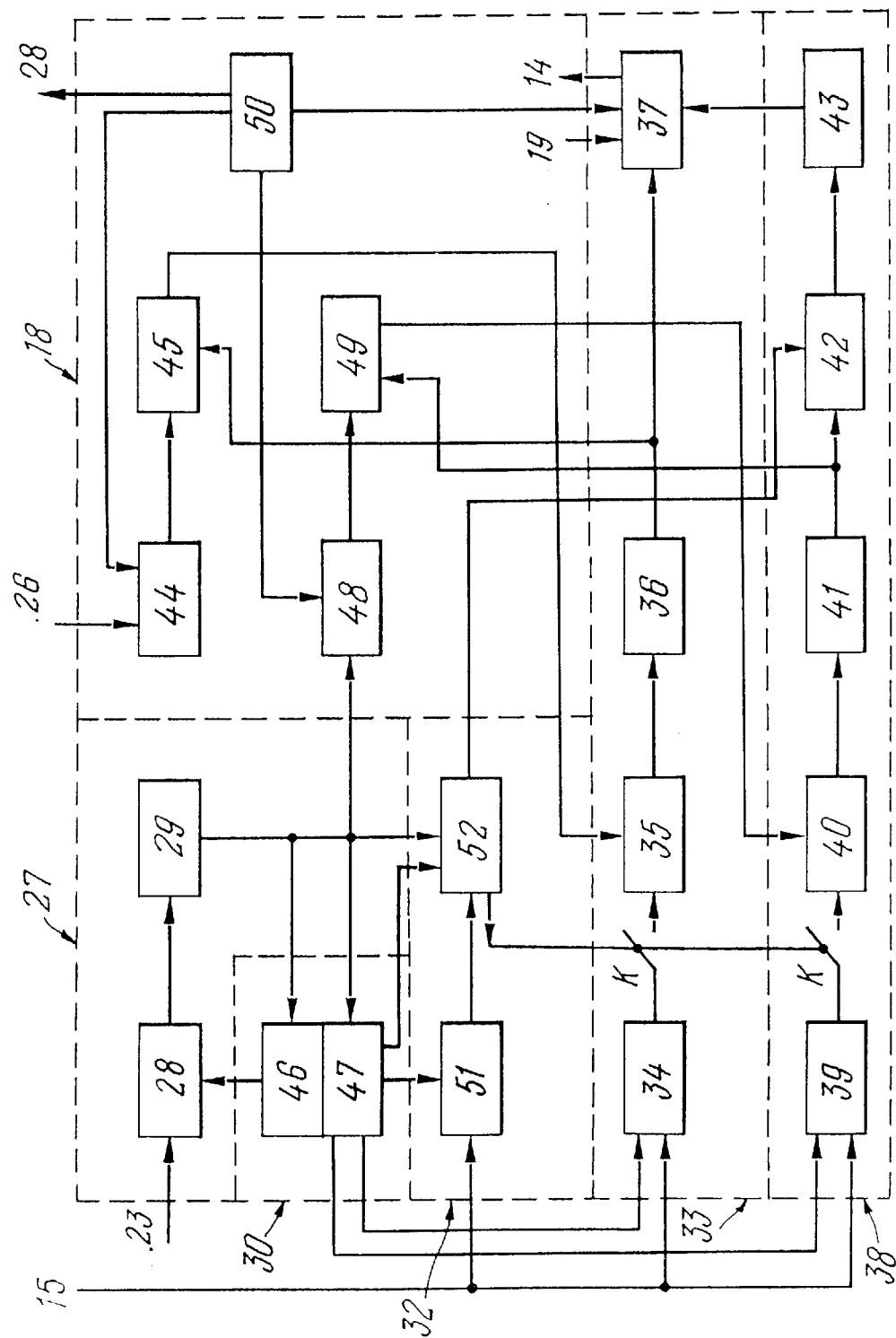
FIG. 5 is a block diagram of an apparatus implementing the method of signal search and initial synchronization.

FIG. 5 shows a block diagram of the user station apparatus implementing the method of searching the initial synchronization of channels, according to the invention. FIG. 5 explains and supplements FIG. 4. Additionally introduced into the circuit of FIG. 5 are the following units: 44. A subtractive mixer. 45. A phase detector with a lowpass filter. 46. A synchronization code generator. 47. Code (user, internal) generator of the transmitter. 48. A subtractive mixer. 49. A phase detector with a lowpass filter. 50. A frequency spectrum synthesizer. 51. A correlator. 52. A search mode control unit. K. Switch. The elements 44 and 45; 48 and 49 together with the elements 35, 36, 40 and 41 form two circuits of phase auto tuning of frequency, which compensate for the Doppler increment by the carrier and clock frequencies. The units 51, 52 disclose the unit 32, and the units 46 and 47 disclose the unit 30.

The apparatus for signal search and initial channel synchronization comprises, at the user station, a frequency tracking circuit (22) including a high-frequency path, a subtractive mixer (23), a code demodulator (24) with an intermediate frequency amplifier, a phase detector (25) with a lowpass filter and a reference generator, a controlled generator (26), and also a frequency spectrum synthesizer (50). In what follows, the corresponding output of the frequency spectrum synthesizer (50) is used in the unit (25) instead of the reference generator. The apparatus, according to the invention, further comprises a delay tracking circuit (27) including the discriminator (28) with a lowpass filter, a controlled clock generator (29), code (synchronization, user, internal) generators (30), which are phased with each other. In addition, the apparatus comprises a circuit (33) of phase (or frequency) auto tuning of the transmitter frequency, including a phase (frequency) discriminator (34) with a lowpass filter, a controlled generator (36), and also a modulator (37); a code delay tracking circuit (38) of the transmitter, including a delay discriminator (39) with a lowpass filter, a controlled clock frequency generator (41), code generator (43) of the transmitter (transponder-calling and internal codes).

Introduced into the apparatus is a search correlator (51) connected, via the reference input, to code (user, internal) generators (47) which are phased with a synchronization code generator (46). The search correlator (51) is connected to a search mode control unit (52) which is coupled to and phased with the controlled clock generator (29) and to the code (user, internal) generatore (47), and, via the control output, is connected to two switches K included into the circuit (33) of phase (or frequency) autotuning of frequency and the circuit (38) for tracking the transmitter code delay, and also to a scanning circuit (42) cut in between the output-input of the clock frequency generator (41) and the code generators (43) of the transmitter (transponder-calling and internal codes).

The apparatus also comprises two circuits (18) of the Doppler shift compensation by the carrier and clock frequencies, each of which includes subtractive mixers (44) and (48) having their inputs connected, respectively, to the outputs of the frequency spectrum synthesizer (50) and the outputs of the controlled generator (26) and the controlled clock generator (29), said mixers having their outputs connected, through the phase detectors (45, 49) with lowpass filters, to introduced voltage adders (35) and (40), the first of which is connected, through said switch (K), to the output of the phase (frequency) discriminator (34) with a lowpass filter, and the second of which is connected, also through the switch (K), to the output of the discriminator (39) with a lowpass filter, the output of one voltage adder (35) being connected, via the controlled generator (36), to the input of said phase detector (45) with a lowpass filter, and the output of the second voltage adder is connected, via the controlled clock frequency generator (41) to the input of the second phase detector (49) with a lowpass filter.

The apparatus operates in the following manner. First, the units (22), (27) of the user transmitter are synchronized by the received synchronization signal of the satellite transponder, then the Doppler increments are compensated by the carrier and clock frequencies. Considered hereinbelow is only compensation by clock frequency because compensation by carrier frequency is performed in a similar manner. Let us write the current frequency of the controlled clock generator (29) as $(f_{nc} \pm f_{Di})$ where $f_{nc}$ is the nominal value of the clock frequency, and $f_{Di}$ is the Doppler increment. The reference frequency equal to $2f_{nc}$ is fed to a second input of the subtractive mixer (48) from the frequency spectrum synthesizer (50). Then, at the output of the subtractive mixer (48) we shall have $(f_{nc} \mp f_{Di})$ This frequency is introduced into the controlled clock frequency generator (41) by the phase auto tune circuit.

After compensating the Doppler increments by the carrier and clock frequencies, there is provided the process of scanning by the delay on the commands from the search mode control unit as a result of adding and blanking pulses from the output of the clock frequency generator (41). The instant of coincidence of the delays of the signal reemitted by the transponder and received by the receiver and the reference signal from the output of the generator (47) of the transmitter internal codes is fixed by the search correlator (51). This instant of time is fed to the search mode control unit (52) and serves as the signal for change over to the scanning in the other direction in accordance with the algorithm described in the method. Calculation of the number of the scanning steps and a subsequent discrete inputting of the delay equal to half the number of the scanning steps between the first and the k-th coincidence of the delays is effected by the search mode control unit (52). After the discrete inputting of the delay, the same unit causes the switch K to make, which makes it possible to operate in response to the initial mismstch, by means of the transmitter auto tune circuits (33) and (38) by frequency and code delay, respectively, and to ensure lock-in and tracking of the signal parameters by frequency and code delay. After having conducted the above-listed combination of operations, the channel is ready for reception and transmission of information.

Industrial Applicability

The method and apparatus for multiple-station communication can find application in communications systems of any type, and also in the control systems for space vehicles.

I claim:

1. A method of multiple-station communication for low-orbit satellite systems, comprising the steps of transmitting by user stations synchronization signals and information-modulated signals, reswitching the information-modulated signals aboard a satellite transponder, and emitting thereof at different frequencies by spaced apart beams with the use of phase-shift keying, emitting by the transponder its own synchronization signal, receiving the synchronization signal from the satellite transponder by the user stations and the information-modulated signals meant therefor, characterized in that the method further comprises the steps of generating and emitting, at the satellite transponder, a wideband pseudorandom synchronization signal with phase-shift keying over the entire width of the transmission spectrum from the satellite transponder and over the entire service area divided into cells with the power density gradually increasing from the area center to the edges thereof, modulating said wideband pseudorandom synchronization signal with service information intended for control of the communications system, rejecting synchronization signal spectrum sections coincident, at the time of emission, with the spectrum of the signals emitted by the satellite transponder and carrying information, with the emitted power of the synchronization signal being constant, checking at the satellite transponder the location of all the user stations with respect to the spatial cells formed by the beams of an on-board antenna of the satellite transponder, receiving information packets from the user stations and storing the information portion thereof, determining from packet preambule the carrier-frequency and code-delay mismatches against standards disposed at the satellite transponder, with subsequent storage thereof, retrieving from a memory, shaping and emitting groups of information packets within preset time intervals, said information packets being meant to be transmitted into different spatial cells with preambles including mismatches for each user station, all the user stations performing reception of the synchronization signal from the satellite transponder and separation of service information with simultaneous rejection of the synchronization signal spectrum portion coincident with the spectrum of the signals carrying information from the spatial cell in which the particular user station is located, performing compensation for the Doppler shift in auto tune transmitters by the carrier and clock frequencies using the synchronization signal received from the satellite transponder, performing autotuning of the own transmitters by the carrier frequency and code delay using the mismatch values separated from said preamble, sending a query to the satellite transponder on the necessity of communication with other user stations by emitting, by the auto tuned transmitters, several cycles of a pseudorandom radio signal with the code assigned for the call of the satellite transponder with a delay individually preset for each of the user stations, identifying at the satellite transponder the number of the calling user station and the spatial cell in which it is disposed by the received call signal and its delay, and reporting by means of the calling party code the time interval allocated thereto and the internal code for two-way communication with the satellite transponder, the number of the called party identified at the satellite transponder with its coordinates and the spatial location cell being reported to the satellite transponder from the calling party within the time interval allocated thereto by modulating the internal code, and with the called user station being disengaged, a call arrives from the satellite transponder with the use of its subscriber's code, said call presetting at the same time the time interval and internal code for the two-way communication with the satellite transponder, performing the initial synchronization of the auto tune transmitter from the called user station after receiving a call from the satellite transponder, and reporting to the satellite transponder within the assigned time interval on readiness for communication by modulating the assigned internal code and thereafter separating at the satellite transponder and reporting to the two user stations the time. intervals and the numbers of the internal codes to establish two-way communication, the time intervals being allocated proceeding from the condition of convenience of routing the packets taking into consideration the cells of location of the user stations, establishing thereafter the internal codes in the transmitter and receiver at each user station, providing information shaping in a digital form and the time compression thereof, performing multibase encoding of the information by the allocated internal code and emitting of a signal within the assigned time interval with a preamble including several cycles of the internal code with a fixed delay, or several cycles of the code allocated to a group of user stations, and performing at the user stations separation of the packets intended therefor, demodulation, decompression and separation of information transmitted to the user stations.

2. A method as claimed in claim 1, characterized in that the code allocated to the user stations for calling the satellite transponder with the delay established individually for each user station is additionally modulated by a short message including information on the number of the called party with subsequent demodulation and separation of said message at the satellite transponder.

3. A method as claimed in claim 1, characterized in that it further comprises the steps of establishing intersatellite communication with neighbour satellite transponders similar to the communication established between the satellite transponder and one of the user stations, each of the satellite transponders performing, by the principle of constructing the system, both the part of a user station synchronized from the neighbour satellite transponder and the part of a satellite transponder from which are synchronized other satellite transponders, determining at the satellite transponder the time of exit from the common service area of each of the user stations and from the spatial cell exposed to one of the spatial beams, each of the user stations being informed about this with simultaneous presenting thereto recommendation on switch-over to communication with the most favourable satellite transponder at a new frequency and time interval of another spatial beam, whereupon at the user station, simultaneously with maintaining the communication, changing over to reception of a synchronization signal from the recommended satellite transponder, establishing a new frequency and time interval and synchronizing from the particular satellite the auto tune transmitter by frequency and delay, transmitting information for some time to both the satellite transponders, and matching the passage of information, at the satellite transponders with the use of intersatellite communications lines, from the user stations in time, effecting whereupon synchronous automatic switch-over of the user stations to the communication via the new satellite transponder only.

4. A method as claimed in claims 1, characterized in that several information packets are transmitted within the same time intervals bar different internal codes, the levels of the input signals are measured at the satellite transponder, higher- and lower-power signals are determined and the levels of the power correction are transmitted in the preamble, and the power of the transmitters is controlled at the user stations.

5. A method as claimed in claims 1, characterized in that it further comprises the steps of transmitting from the user stations located in reference points with precisely known coordinates information on the coordinates of said reference points and the navigation corrections obtained as a result of comparison of the precisely known coordinates with those obtained as a result of estimations from navigations satellites, demodulating said information at the satellite transponder, subsequently modulating by said information the synchronization signal emitted from the satellite transponder and demodulating said information by the interested users.

6. A method as claimed in claim 5, characterized in that the navigation information, received from the user stations located in the reference points with precisely known coordinates, is switched at the satellite transponder and transmitted by each of the spaced apart beams within the predetermined time intervals and the allocated internal codes and subsequently separating said information by the interested user stations.

7. An apparatus for implementing the method of multiple-station communication for low-orbit satellite systems as claimed in claim 1, which comprises, at a satellite transponder, a transceiving phased antenna array (3) with a modulator and a high-frequency portion, a receiver (7) of communication and service information signals, a unit (5) for generating a synchronization signal and a service information signal, a frequency spectrum synthesizer (2), an antenna (1) for transmitting a synchronization signal with a high-frequency portion, a unit (6) for generating packets with a buffer memory, a user station including a transceiving antenna (14) with a high-frequency portion of a transmitter, a receiver (15) of signals with a high-frequency portion and channels for separating information, a receiver (16) of synchronization signals, which comprises a circuit (22) of phase auto tuning of frequency, a delay tracking circuit (27), interconnected by a cross link, and a channel (31) for service information separation; a transmitter (17) with frequency and code delay auto tuning, including a frequency auto tune circuit (33) and a delay tracking circuit (38), a unit (19) for generating digital information with a device for compressing thereof, a buffer memory and a packet shaper, a control unit (20), characterized in that installed at the satellite transponder between the synchronization signal generating unit (5) and the antenna (1) for transmitting a synchronization signal are rejection filters connected, via a control input, to a control unit (12), there are introduced frequency and delay discriminators (8) connected to the buffer memory and a preamble shaper, the input and output of said discriminators being connected, respectively, to a linear output of the receiver (7) of communication and service information signals and to the input of the packet generating unit (6) with the buffer memory, the output of the packet generator being connected to the transceiving phased array (3) with the modulator and high-frequency, portion, there are introduced generators (11) of a synchronization code, internal and user codes, which are controlled from a single clock generator (10) and are phased with each other, the internal code generator being connected to the packet generating unit (6) and the frequency and delay discriminators (8) with the buffer memory and preamble shaper, the apparatus further comprises a receiver (9) of a call of the satellite transponder, which is a matched filter connected, via an input, to the receiver (7) of communication and service information signals and, via outputs, to the control unit (12) and to a generator (13) of a user station call, a unit (18) for compensating the Doppler shift being installed at the user station, and rejection filters (21) being connected between the circuit of phase auto tuning of frequency and the signal receiver with the high-frequency portion and information separation channels, the control input of the rejection filters being connected to the output of the control unit (20); generators (30) of a synchronization code, user codes and internal codes synchronized and phased with each other being incorporated into the circuit for tracking the delay of the receiver synchronization signal, the internal code generator being coupled to a discriminator (39) of the delay of the transmitter (17) with frequency and code delay auto tuning, the circuit (38) for tracking the delay of the auto tune transmitter incorporates a code generator for calling the transponder and an internal code generator (43), which are synchronized and phased with each other, and a series combination of a voltage adder, a controlled clock frequency generator (41) and a scanning circuit (42) having its output coupled to an input of the call code generator of the auto tune transmitter and having its input coupled to an output of circuit (32) for search and initial synchronization of the transmitter, said circuit being included in the auto tune transmitter and having its input connected to the output of the signal receiver (15) with the high-frequency portion and information separation channel, the circuit (33) for frequency auto tuning of the transmitter including a voltage adder (35) having its output connected, via a controlled generator (36), to the Doppler shift compensation unit (18).

8. A method of multiple-station communication with integration of high-orbit and low-orbit satellite systems which comprise satellite transponders in stationary and low orbits, which method comprises the steps of emitting synchronization signals and information-modulated signals generated on the basis of wideband pseudorandom signals with phase manipulation, and also receiving information-modulated signals and synchronization signals from low-orbit satellite transponders by means of small-size user stations, characterized in that it further comprises the steps of generating, at high-orbit satellite transponders, a wideband pseudorandom synchronization signal with phase manipulation over the entire spectrum width assigned for information transmission from the satellite transponder with code differentiation of the signals generated by different satellite transponders, emitting said signal over the entire common spatial service area divided into cells and including visible orbits of all low-orbit satellite transponders, with the power density gradually increasing from the area center to the edges thereof, modulating said signal with service information, rejecting signal spectrum sections coincident at the time of emission with the spectrum of the emitted own signals which carry information, with the output power of the synchronization signal remaining constant, receiving signal packets from the low-orbit satellite transponders and storing the information portions thereof, determining from the preamble of said packets the delay and frequency mismatches against standards disposed at the satellite transponders and subsequently shaping preambles from the mismatches and storing the preambles at the satellite transponders, reswitching the stored information portions of the packets assigned for the user stations of the low-orbit communications system, and groups of packets to be transmitted to various spatial cells in which are disposed the corresponding satellite transponders of the low-orbit system, forming spatial emission zones by means of a multibeam transceiving antenna, which zones partially overlap, thereby providing a full coverage of the entire service area, the major axes of said zones being parallel to the directions of motion of the satellite transponders of the low-orbit system, controlling the current position of the satellite transponders with respect to the spatial service zones, receiving the synchronization signal at the low-orbit satellite transponders and separating service information, rejecting said signal spectrum section coincident with the spectrum of the packets received at that time, receiving packets of high-orbit satellite transponders and separating information assigned thereto, performing, at each of the satellite transponder of the low-orbit system, synchronization of its own transmitter by the delay of the emitted signal code and frequency with the use of the corresponding mismatches from the separated packet preamble and with preliminary compensation for the Doppler shift by the carrier and clock frequencies, the value of said compensation being obtained from the received synchronization signal, forming a beam of the transceiving antenna to the corresponding high-orbit satellite transponder from the calculated data of the relative position of the satellite and/or from the estimations of the power maximum of the received synchronization signal, said beam being formed wide in the direction of the satellite transponder motion and narrow in the perpendicular direction, emitting from a low-orbit satellite transponder for calling a high-orbit satellite-transponder on a request of a user station of the low-orbit system to establish communication, several cycles of the pseudorandom signal, which are assigned for a call, said signal being synchronized from a common clock generator with a delay individual for each low-orbit satellite transponder, modulating said signal with information on the number of the called user station, identifying the number of the calling satellite transponder by the call signal received at the high-orbit satellite transponder and obtaining information on the number of the called user station, determining for communication the satellite transponder of the low-orbit system and reporting thereto the number of the called user station in the user code of said satellite transponder, receiving the call at the satellite transponder of the low-orbit system, relaying the call to the corresponding user station, and, if the station is ready, at the calling and called satellite transponders of the low-orbit system, allocating and transmitting the internal codes and time intervals for two-way communication, which are received and established by the user stations and at the low-orbit and high-orbit satellite transponders.

9. A method of search and initial synchronization of channels in a satellite communications system in which wideband pseudorandom signals are used for synchronization, and synchronization of the user station transmitters are carried out by a synchronization signal from a satellite transponder with direct relaying of the signal, said method providing emission by each user station, in addition to an information-modulated signal, of its own synchronization signal, reception from the satellite transponder of information-modulated signals and its own synchronization signal, characterized in that the method further comprises performing at the user station, after receiving the synchronization signal of the satellite transponder, unidirectional discrete scanning of the delay of the emitted synchronization signal with preliminary compensation of the Doppler increment by the carrier and clock frequencies, which increment is separated from the received synchronization signal of the satellite transponder, noting the instant of coincidence of the own relayed synchronization signal delay with the delay of the reference signal of the same waveform phased from the synchronization signal of the satellite transponder received by the receiver, reversing at that instant the direction of scanning, again noting the instants of coincidence of the delays of said signals, ceasing scanning at a K-th instants of coincidence of the delays, calculating the number of the steps of scanning between the first and the K-th instants of coincidence of the delays, then inputting the delays into the emitted synchronization signal in the initial direction of scanning by a value equal to half the calculated number of the scanning steps between the first and the K-th coincidence of the delays, where K=2 with $(\tau/T)<1$ and K=N−1 with $(\tau/T)\geq 1$, where T is the time of exhaustive search of all possible delays of the signal, $\tau$ is the time of propagation of the signal in forward and reverse directions, N is the integral part $(\tau/T)$.

10. A method as claimed in claim 9, characterized in that, with the a priori known signal delay on the route (or distance to the transponder), a delay is introduced into the emitted signal at the user station with a reverse sign relative to the received synchronization signal, said delay being proportional to $[-(\tau/2)_{ap} \mp \Delta]$, where $(\tau/2)_{ap}$ is the a priori known delay, $\Delta$ is the maximum value of the a priori error in the knowledge of the delay, and scanning is commenced in the direction $\pm\Delta$, the instant of coincidence of the delays is noted of the own relayed signal received by a receiver and the reference signal of the same waveform phased from the satellite transponder synchronization signal received by the receiver, the discrete delay $2[(\tau/2)_{ap} \pm \Delta]$ is introduced into the emitted signal and scanning is performed in the direction $\pm\Delta$, a new instant of coincidence of the signal delays is noted, the resultant is estimated taking into account the scanning of the delay between the instants of coincidence of the delays of the reference and relayed signals, and then a discrete introduction of the delay is performed in the initial direction, said delay being equal to half the resultant delay.

11. A method as claimed in claim 9 or 10, characterized in that at the satellite transponder with signal processing, the instants of coincidence of the delays of the synchronization signal emitted by the user station and the reference signal of the same waveform are noted, said reference signal being phased from a generator of the synchronization signal codes disposed at the satellite transponder, and the instants of coincidence of the delays are subsequently relayed by modulating the signal from the satellite transponder, the signal is received and demodulated by the appropriate user station.

12. An apparatus for signal search and initial synchronization of channels in a satellite communications system, which comprises, at a user station, a circuit (22) of phase auto tuning of frequency, which is connected, via rejection filters (21), to a signal receiver (15) with a high-frequency portion and which includes a subtractive mixer (23), a code demodulator (24) with an intermediate frequency amplifier, a phase detector (25) With a lowpass filter, a controlled generator (26) connected to a reference input of the subtractive mixer (23); a frequency spectrum synthesizer; a delay tracking circuit (27) including a series combination of a discriminator (28) with a lowpass filter, a controlled generator (29), a synchronization code generator (46) connected to a reference input of the discriminator (28) and user and internal code generators (47) of a transmitter; a circuit (33) of phase (frequency) auto tuning of the transmitter frequency, including a phase (frequency) discriminator (34) with a lowpass filter, a controlled generator (36), a modulator (37) and a high-frequency amplifier; a circuit (38) for tracking the transmitter delay code, including a delay discriminator (39) with a lowpass filter, a controlled clock frequency generator (41), generators (43) of the transmitter code of calling a transponder and internal codes, said transmitter being coupled to the modulator (37) with the high-frequency amplifier, the inputs of the phase (frequency) discriminator (34) with the lowpass filter and of the delay discriminator (39) with the lowpass filter being connected to the signal receiver (15) with the high-frequency portion, and the input of the discriminator (28) with the lowpass filter being connected to the output of the subtractive mixer (23), characterized in that it further comprises a Doppler shift compensation unit made up of two identical circuits which comprise subtractive mixers (44) and (48), phase detectors (45) and (49) with lowpass filters, voltage adders (35), (40), the inputs of the subtractive mixer (44) in the first circuit being connected to the outputs of the controlled generator (26) and to the corresponding output of a frequency spectrum synthesizer (50), the second input of the phase detector (45) with the lowpass filter being connected to the output of the controlled generator (36), and the outputs of the subtractive mixer (48) in the second circuit being connected to the outputs of the controlled clock generator (29) and to the corresponding. output of a frequency spectrum synthesizer (50), and the second input of the phase detector (49) with a lowpass filter is connected to the output of the controlled clock frequency generator (41), said voltage adder (35) of the first circuit being included into the circuit (33) of phase (frequency) auto tuning of the transmitter frequency between the input of the controlled generator (36) and, through a switch K, the output of the phase (frequency) discriminator (34) with a lowpass filter, and said voltage adder (40) of the second circuit being included into the code delay tracking circuit (38) of the transmitter between the input of the controlled clock frequency generator (41) and, through a second switch K, the output of the delay discriminator (39) with a lowpass filter, a circuit (32) for signal search and initial synchronization of the transmitter which circuit is a series combination of a search correlator (51) and search mode control unit (52) coupled to a scanning circuit (42), the input of the search correlator being connected to the output of the signal receiver with a high-frequency portion and to the reference output of the internal code generator (47) of the transmitter, and the second and third inputs of the search mode control unit being connected to the output of the controlled clock generator (29) and to the reference output of the internal code generator (47) of the transmitter, and the control output of the search mode control unit (52) being connected to the switches K, the scanning circuit (42) being connected between the input of the generator (43) of the transmitter code of the transponder call and of the internal codes and the output of the controlled clock frequency generator (41).

* * * * *